US009247325B2

(12) United States Patent
Patel et al.

(10) Patent No.: US 9,247,325 B2
(45) Date of Patent: Jan. 26, 2016

(54) HYBRID ELECTRO-OPTICAL DISTRIBUTED SOFTWARE-DEFINED DATA CENTER ARCHITECTURE

(71) Applicant: NEC Laboratories America, Inc., Princeton, NJ (US)

(72) Inventors: Ankitkumar N. Patel, Bridgewater, NJ (US); Philip Nan Ji, Cranbury, NJ (US); Yawei Yin, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 14/551,973

(22) Filed: Nov. 24, 2014

(65) Prior Publication Data

US 2015/0147060 A1 May 28, 2015

Related U.S. Application Data

(60) Provisional application No. 61/909,446, filed on Nov. 27, 2013.

(51) Int. Cl.
*H04J 14/02* (2006.01)
*H04Q 11/00* (2006.01)

(52) U.S. Cl.
CPC ........ *H04Q 11/0005* (2013.01); *H04J 14/0202* (2013.01); *H04Q 11/0071* (2013.01); *H04Q 2011/0052* (2013.01)

(58) Field of Classification Search
CPC .......... H04Q 11/0005; H04Q 11/0071; H04Q 2011/0052; H04J 14/0202
USPC .................................. 398/45, 48, 46, 58, 59
See application file for complete search history.

(56) References Cited

U.S. PATENT DOCUMENTS

| | | | | |
|---|---|---|---|---|
| 6,567,429 | B1 * | 5/2003 | DeMartino | H04J 14/02 370/395.64 |
| 6,647,208 | B1 * | 11/2003 | Kirby | H04Q 11/0005 398/45 |
| 7,599,620 | B2 * | 10/2009 | Graves | H04Q 11/0066 398/51 |
| 8,503,879 | B2 * | 8/2013 | Xu | H04Q 11/0005 398/45 |

(Continued)

OTHER PUBLICATIONS

Farrington, N., et al. "Helios: A Hybrid Electrical/Optical Switch Architecture for Modular Data Centers," Aug. 2010. pp. 1-12.

(Continued)

*Primary Examiner* — Dalzid Singh
(74) *Attorney, Agent, or Firm* — Joseph Kolodka

(57) ABSTRACT

A hybrid electro-optical data center system includes multiple tiers. A bottom tier has one or more bottom tier instances, with each bottom tier instance including one or more racks, an electro-optical switch corresponding to each rack, and a first bottom tier optical loop providing optical connectivity between the electro-optical switches of the respective bottom tier instance. At least one server within each rack is electrically connected to the respective electro-optical switch and at least one super-server within each rack is electrically and optically connected to the respective electro-optical switch. A top tier includes electro-optical switches, each electrically connected to an electro-optical switch in a respective bottom tier instance, a first top tier optical loop providing optical connectivity between the electro-optical switches of the top tier, and one or more optical add/drop modules providing optical connectivity between the first bottom tier optical loop and the first top tier optical loop.

17 Claims, 2 Drawing Sheets

(56) References Cited

U.S. PATENT DOCUMENTS

| | | | | |
|---|---|---|---|---|
| 8,867,915 B1 * | 10/2014 | Vahdat | .................. | H04Q 11/00 398/55 |
| 2012/0321310 A1 * | 12/2012 | Spock | ..................... | H04J 14/00 398/59 |
| 2013/0287397 A1 * | 10/2013 | Frankel | ................ | H04B 10/271 398/50 |
| 2014/0119728 A1 * | 5/2014 | Zhang | ................ | H04J 14/0204 398/48 |
| 2014/0363160 A1 * | 12/2014 | Gumaste | ............. | H04J 14/0212 398/48 |

OTHER PUBLICATIONS

Kachris, C., et al. "A Survey on Optical Interconnects for Data Centers," IEEE Communications Surveys & Tutorials, vol. 14, No. 4, Fourth Quarter 2012. May 2011. pp. 1021-1036.

Wang, G., et al. "c-Through: Part-time Optics in Data Centers," Aug. 2010. pp. 327-338.

\* cited by examiner

HYBRID ELECTRO-OPTICAL DISTRIBUTED SOFTWARE-DEFINED DATA CENTER ARCHITECTURE

RELATED APPLICATION INFORMATION

This application claims priority to provisional application number 61/909,446 filed Nov. 27, 2013, and the contents thereof are incorporated herein by reference.

BACKGROUND OF THE INVENTION

Due to emerging explosive growth of cloud-centric applications, the next generation data centers needs to achieve low latency, high throughput, and high resource efficiency. Furthermore, to offer such cloud services economically, operational costs such as power consumption and management complexity as well as the capital cost of these data centers should be reduced.

To address the forthcoming heavy demands of cloud resources, the computing industry has continually investigates high-end servers with high numbers of processing cores integrated onto a single chip. In addition, to support the heavy traffic generated from servers, servers are equipped with high-speed network interface cards equipped with optical pluggable transceiver modules in addition to standard electrical ethernet interfaces. Distributed cloud services over such servers generate heavy volumes of network traffic, so the next generation data centers should support high speed and low latency intra-data center and inter-data center connectivity.

Conventional data center architectures use multiple racks hosting servers. These racks are interconnected through commodity switches using, e.g., a fat-tree 2-Tier or 3-Tier architecture. The servers are aggregated into racks and these racks are interconnected through Top of Rack (TOR) switches. The TOR switches are further interconnected through aggregate switches. In 3-Tier topologies, the aggregate switches are further interconnected through core switches using high speed connections.

Conventionally, inter-connections of servers are provisioned through electric switch fabrics. Electric switch fabrics offer high-speed switching of packets, statistical multiplexing of traffic, and low latency in connection setup while effectively handling bursty traffic. However, such technology consumes high power and offers limited bandwidth capacity. Thus, due to the high communications requirements in data centers, an application of electrical switch fabrics leads to considerable power consumptions, introduces packet transmission latency, and increases operational cost. On the other hand, optical technology offers high capacity, low cost, and low power communications. However, optical switches suffer from high latency in a connection setup due to its low-speed switching. Optical switch fabrics do not offer statistical multiplexing, may not be suitable to handle bursty traffic due to the limited buffering capacity. Currently, optical technology is just used to interconnect different data centers using point-to-point optical channels. Furthermore, the conventional architecture is of warehouse scale, which generates tremendous requirements of power supply, space, and cooling.

Some solutions use hybrid data center architectures by interconnecting TOR switches with micro-electromechanical switches (MEMS) in addition to electrical switch fabrics. These architectures use MEMS with a large number of ports and, thus, are not scalable. Additionally, if the MEMS fails, the architecture loses all optical connectivity, creating a single point of failure. The architecture cannot support an aggregation of traffic from multiple TOR switches onto a single optical channel. Thus, traffic cannot be statistically multiplexed onto a single optical channel and optical bandwidth cannot be shared among connections that connect different switches.

BRIEF SUMMARY OF THE INVENTION

A hybrid electro-optical data center system includes a bottom tier and a top tier. The bottom tier has one or more bottom tier instances, with each bottom tier instance including one or more racks, an electro-optical switch corresponding to each rack, and a first bottom tier optical loop providing optical connectivity between the electro-optical switches of the respective bottom tier instance. At least one server within each rack is electrically connected to the respective electro-optical switch and at least one super-server within each rack is electrically and optically connected to the respective electro-optical switch. The top tier includes one or more electro-optical switches, each electrically connected to an electro-optical switch in a respective bottom tier instance, a first top tier optical loop providing optical connectivity between the electro-optical switches of the top tier, and one or more optical add/drop modules providing optical connectivity between the first bottom tier optical loop and the first top tier optical loop.

A hybrid electro-optical data center system includes a bottom tier, a middle tier, and a top tier. The bottom tier includes one or more bottom tier instances, each bottom tier instance having one or more racks, an electro-optical switch corresponding to each rack, a first bottom tier optical loop providing optical connectivity between the electro-optical switches of the respective bottom tier instance. At least one server within each rack is electrically connected to the respective electro-optical switch and wherein at least one super-server within each rack is electrically and optically connected to the respective electro-optical switch. The middle tier includes one or more electro-optical switches, each electrically connected to an optical switch in a respective bottom tier instance, a first middle tier optical loop providing optical connectivity between the electro-optical switches of the middle tier, and one or more optical add/drop modules providing optical connectivity between the first bottom tier optical loop and the first middle tier optical loop. The top tier includes one or more electro-optical switches, each electrically connected to an electro-optical switch in a respective middle tier instance, a first top tier optical loop providing optical connectivity between the electro-optical switches of the top tier, and one or more optical add/drop modules providing optical connectivity between the first middle tier optical loop and the first top tier optical loop.

DETAILED DESCRIPTION

Embodiments of the present principles achieve the benefits of both electrical and optical switching technologies using a hybrid electro-optical, distributed, software-defined data center architecture in which interconnection of servers is provisioned through partially electrical switch fabrics and partially optical switch fabrics. The architecture set forth herein provides all-optical interconnectivity between some servers—referred to herein as "super servers"—of distributed data centers.

A hybrid electro-optical (HEO) switch interconnects servers using electrical and optical switching technologies. In an HEO switch, an electrical switch fabric is interconnected with an optical add/drop module using tunable dense wavelength division multiplexing (DWDM) optical pluggable transceiver modules. Electrical switch fabrics of the HEO switches are interconnected through a fat-tree architecture, while optical add/drop modules are interconnected through rings of optical fibers. The scalability of this architecture can be enhanced by interconnections of multiple optical rings using optical add/drop modules. In case of some fiber cuts or failure of optical add/drop modules, only a fraction of the optical connectivity is lost, preventing a single point of failure. Furthermore, the architecture can support traffic aggregation at any tier of the fat-tree architecture. Traffic can be statistically multiplexed onto a single optical channel and, thus, the optical bandwidth can be shared among multiple connections.

Standard computing servers are replaced by super servers in which network interface cards are used that include optical pluggable transceiver modules in addition to electrical interfaces. Thus, in addition to all-optical communications between top-of-rack (TOR) switches, the present embodiments also establish all-optical communications between super servers. It is anticipated that the super-servers will have particularly high data throughput needs, thereby justifying the provision of direct optical communications. Any number of servers in a given rack may be super-servers.

Figure 1:
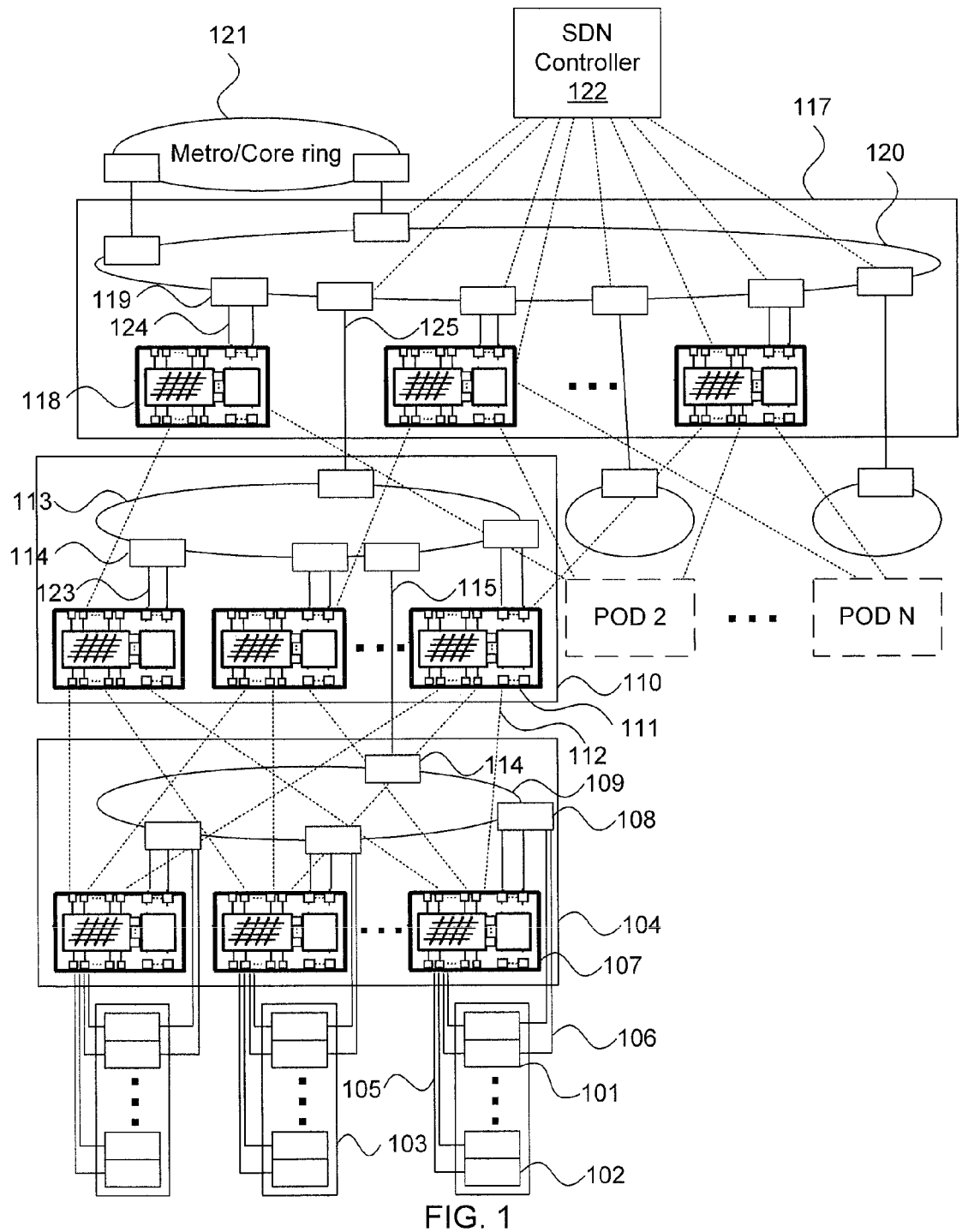
FIG. 1 is a block diagram of a hybrid electro-optical architecture in accordance with the present principles.

Referring now to FIG. 1, an HEO data center architecture is shown. This architecture is abstracted into three tiers for the sake of scalability. In data centers, severs are arranged into racks. However, instead of just having standard servers, the architecture of FIG. 1 has a mix of super-servers 101 and standard servers 102 inside racks 103. Standard servers 102 may include low-speed network interface cards with, e.g., electrical Ethernet interfaces. Super-servers 101, meanwhile, include high-speed network interface cards with, e.g., tunable DWDM optical pluggable transceiver modules along with electrical interfaces. These servers are connected to a first tier 104 of the switching layer that includes HEO switches using electrical cables 105 and optical fiber cables 106.

An HEO switch includes an electrical switch fabric 107 and an optical add/drop module 108. An electrical switch of an HEO switch can be either a standard layer 2 (non-OpenFlow) switch or an OpenFlow protocol enabled programmable switch. On the other hand, an optical add/drop module of an HEO switch includes a wavelength selective switch (WSS) and a coupler as shown below. The add/drop interfaces of an optical add/drop module can be either connected to network interface cards of the super servers 201, high-speed ports of an electrical switch, or add/drop interfaces of other modules.

Due to the finite number of electrical ports and optical add/drop ports of an HEO switch, a rack can support a finite number of standard servers 102 and super-servers 101. Similar to top-of-rack switches of conventional data centers, HEO switches provide interconnectivity for servers within a rack. Additionally, HEO switches provide all-optical connectivity for super-servers 101 and electrical switches 107 through fiver rings 109. Thus, all-optical communications between super-servers 101 and electrical switches 107 eliminate additional switching layers compared to the standard data center switch architecture. Thus, the proposed architecture can improve latency in data transmission and reduce power consumption.

Standard servers 102 and low-speed ports of electrical switches at tier 1 104 are interconnected through another layer of HEO switches referred to herein as tier 2 110. The electrical switches 111 of HEO switches at tier 2 110 interconnect electrical switches 107 of HEO switches at tier 1 104 through electrical cables 112. Additionally, to provide all-optical connectivity among the HEO switches at tier 2 110, optical add/drop modules of HEO switches are interconnected through a fiber ring 113. To enhance the scalability of optical interconnectivity and to enable all-optical communications between tier 1 104 and tier 2 110, each fiber ring of tier 1 104 is connected with all the fiber rings of tier 2 110, using only optical add/drop modules 114 with fibers 115 at multiple places.

To enhance the scalability and to guarantee a certain amount of bisectional bandwidth from any rack to any other rack in the HEO data center, a finite number of racks is interconnected through HEO switches in tier 1 104 and tier 2 110. A combination of tier 1 and tier 2 provides a hybrid of electrical and all-optical connectivity among the servers and, thus, introduces modularity and is referred to herein as a micro data center. The scalability of a micro data center can be enhanced by partitioning fiber rings 119 in tier 1 104 and tier 2 110 respectively into smaller fiber rings. These smaller rings are interconnected through multiple independent large fiber rings using optical add/drop modules at multiple places. Each small fiber ring is connected to each large fiber at least once. On the other hand, large fiber rings are not connected to each other to ensure their independence.

Multiple micro data center structures are interconnected through a switching layer of tier 3 117. Tier 3 also includes HEO switches. The electrical switches 218 of the HEO switches at tier 3 provide electrical interconnectivity of micro data centers, while optical add/drop modules 219 of the HEO switches provide all-optical interconnectivity among HEO switches and micro data centers. The scalability of tier 3 117 can be addressed by partitioning a fiber ring into smaller fiber rings in tier 3 and interconnecting these smaller fiber rings through independent larger fiber rings. By interconnecting tier 3 of multiple HEO data centers through metro or core fiber rings 121 of the transport network, a distributed HEO data center can be realized. This HEO architecture can be controlled and managed by a logically centralized software-defined networking (SDN) controller 122. The controller 122 controls electrical switches and optical add/drop modules remotely using, e.g., an open standardized protocol such as OpenFlow.

Figure 2:
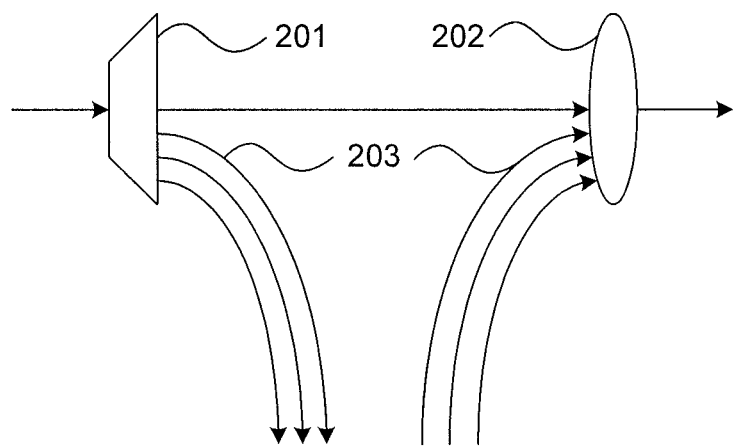
FIG. 2 is a block diagram of an optical add/drop module in accordance with the present principles.

Referring now to FIG. 2, a diagram of an optical add/drop module 108 is shown. A WSS 201 receives a wavelength multiplexed input and splits the input into a selected wavelength output and a set of add/drop interfaces 203. The add/drop interfaces 203 can be either connected to network interface cards of super-servers 201, high-speed ports of an electrical switch, or add/drop interfaces of other modules. A coupler 202 combines the selected wavelength(s) with added signals from the add/drop interfaces 203 to produce an output signal that is sent along the fiber.

Figure 3:
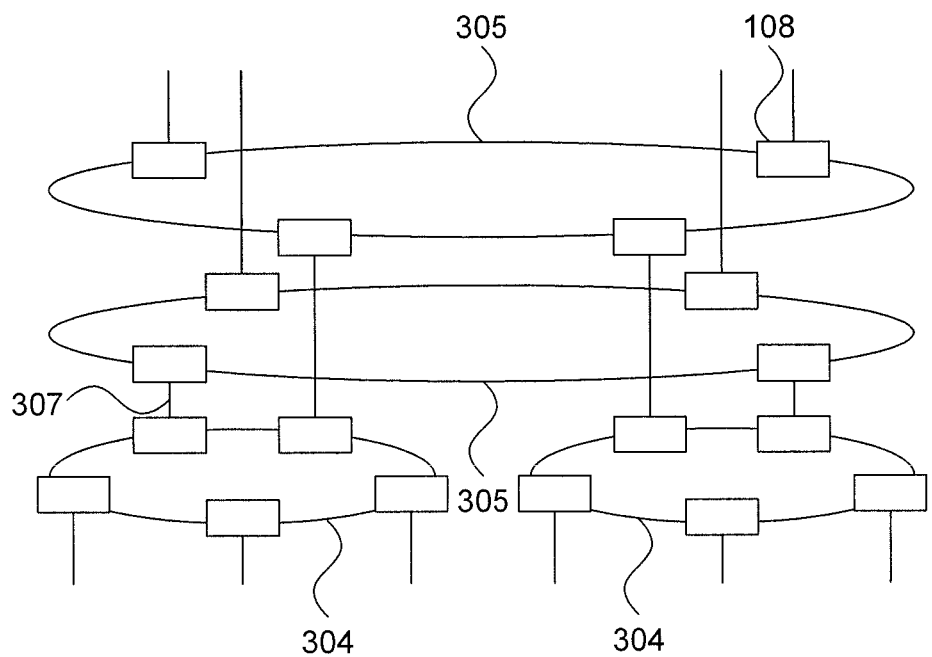
FIG. 3 is a block diagram of a scalable optical transport layer of a single tier of a hybrid electro-optical architecture in accordance with the present principles.

Referring now to FIG. 3, a scalable ring partitioning scheme for tiers 1 and 2 is shown. Each micro data center can be enhanced by partitioning fiber rings 219/213 into smaller fiber rings 304. These small fiber rings 304 are interconnected through multiple independent large fiber rings 305 using optical add/drop modules 307 at multiple places. Each small fiber ring 304 is connected to each large fiber 305 at least once, but the large fiber rings 305 are not connected to each other. This partitioned structure may be used at both tier 1 and tier 2, with the optical add/drop modules 307 providing connections between the large rings 305 of the adjacent tiers. A similar structure can be used for scaling in tier 3, with connections off of the large fiber rings 305 going to the metro/core transport network fiber rings 121 and with the smaller rings 302 connecting to individual micro data centers.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A hybrid electro-optical data center system, comprising:
    a bottom tier comprising one or more bottom tier instances, each bottom tier instance comprising:
        one or more racks;
        an electro-optical switch corresponding to each rack, wherein at least one server within each rack is electrically connected to the respective electro-optical switch and wherein at least one super-server within each rack is electrically and optically connected to the respective electro-optical switch; and
        a first bottom tier optical loop providing optical connectivity between the electro-optical switches of the respective bottom tier instance;
    a top tier, comprising:
        one or more electro-optical switches, each electrically connected to an electro-optical switch in a respective bottom tier instance;
        a first top tier optical loop providing optical connectivity between the electro-optical switches of the top tier; and
        one or more optical add/drop modules providing optical connectivity between the first bottom tier optical loop and the first top tier optical loop.

2. The system of claim 1, wherein the electro-optical switches are configured to provide an all-optical communications path between super-servers.

3. The system of claim 1, wherein the optical loops and optical add/drop modules are configured to provide an all-optical communications path between electro-optical switches.

4. The system of claim 1, wherein each electro-optical switch comprises an electrical switch fabric and an optical add/drop module using tunable dense wavelength division multiplexing.

5. The system of claim 4, wherein each optical add/drop module consists of a wavelength selective switch and a coupler.

6. The system of claim 4, wherein each hybrid electro-optical switch is configured to provide traffic aggregation from multiple electrical connections into a single optical channel.

7. The system of claim 1, wherein the top tier further comprises:
    one or more secondary top tier loops connected to respective sets of electro-optical switches; and
    one or more interlinking loops that provide optical connectivity between the first top tier optical loop and the one or more secondary top tier loops.

8. The system of claim 1, wherein the bottom tier further comprises:
    one or more secondary bottom tier loops connected to respective sets of electro-optical switches; and
    one or more interlinking loops that provide optical connectivity between the first bottom tier optical loop and the one or more secondary bottom tier loops.

9. A hybrid electro-optical data center system, comprising:
    a bottom tier comprising one or more bottom tier instances, each bottom tier instance comprising:
        one or more racks;
        an electro-optical switch corresponding to each rack, wherein at least one server within each rack is electrically connected to the respective electro-optical switch and wherein at least one super-server within each rack is electrically and optically connected to the respective electro-optical switch; and
        a first bottom tier optical loop providing optical connectivity between the electro-optical switches of the respective bottom tier instance;
    a middle tier, comprising:
        one or more electro-optical switches, each electrically connected to an optical switch in a respective bottom tier instance;
        a first middle tier optical loop providing optical connectivity between the electro-optical switches of the middle tier; and one or more optical add/drop modules providing optical connectivity between the first bottom tier optical loop and the first middle tier optical loop;

a top tier, comprising:

one or more electro-optical switches, each electrically connected to an electro-optical switch in a respective middle tier instance;

a first top tier optical loop providing optical connectivity between the electro-optical switches of the top tier; and one or more optical add/drop modules providing optical connectivity between the first middle tier optical loop and the first top tier optical loop.

10. The system of claim 9, wherein the electro-optical switches are configured to provide an all-optical communications path between super-servers.

11. The system of claim 9, wherein the optical loops and optical add/drop modules are configured to provide an all-optical communications path between electro-optical switches.

12. The system of claim 9, wherein each electro-optical switch comprises an electrical switch fabric and an optical add/drop module using tunable dense wavelength division multiplexing.

13. The system of claim 12, wherein each optical add/drop module consists of a wavelength selective switch and a coupler.

14. The system of claim 12, wherein each hybrid electro-optical switch is configured to provide traffic aggregation from multiple electrical connections into a single optical channel.

15. The system of claim 9, wherein the top tier further comprises:

one or more secondary top tier loops connected to respective sets of electro-optical switches; and one or more interlinking loops that provide optical connectivity between the first top tier optical loop and the one or more secondary top tier loops.

16. The system of claim 9, wherein the bottom tier further comprises:

one or more secondary bottom tier loops connected to respective sets of electro-optical switches; and one or more interlinking loops that provide optical connectivity between the first bottom tier optical loop and the one or more secondary bottom tier loops.

17. The system of claim 9, wherein the middle tier further comprises:

one or more secondary middle tier loops connected to respective sets of electro-optical switches; and one or more interlinking loops that provide optical connectivity between the first middle tier optical loop and the one or more secondary middle tier loops.

* * * * *